UNITED STATES PATENT OFFICE 2,269,997

N-SULPHONYLALKYLENIMINE POLYMERS

Gerard J. Berchet, Wilmington, Del., assignor to E. I. du Pont de Nemours & Company, Wilmington, Del., a corporation of Delaware No Drawing. Application March 9, 1939,
Serial No. 260,864

7 Claims. (Cl. 260—2)

This invention relates to new polymeric materials, and more particularly to materials obtained by polymerization of monomeric N-sulphonylethylenimines.

This invention has as an object the provision of new and valuable polymeric materials. Another object is to provide a process for preparing these new polymers. A further object is the provision of new modified cellulosic fibers and fabrics. Other objects will appear hereinafter.

These objects are accomplished by the following invention wherein an N-sulphonylethylenimine, the structure of which is represented by the general formula

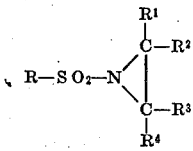

wherein R is an alkyl, cycloalkyl, aryl, or aralkyl radical, and $R^1$, $R^2$, $R^3$, and $R^4$ are hydrogen or hydrocarbon radicals, is polymerized either per se or in admixture with other polymerizable compounds, to a new class of polymers.

British Patent 466,345 discloses the reaction of polymeric ethylenimines with aromatic sulphonyl chlorides. The products are soluble in organic solvents.

The polymerization of polymeric N-sulphonylethylenimines has not hitherto been recorded although many of the monomers have been prepared. The monomeric products are inhibited from polymerization by traces of foreign ingredients, e. g. arylsulphonic acids which are almost inescapable by-products of their formation and isolation. A trace of p-toluenesulphonic acid effectively prevents p-toluenesulphonylethylenimine from polymerizing. This property may be made use of to keep the monomer from premature polymerization and must be taken into account on polymerization.

As a necessary preliminary to the process of the present invention, the N-sulphonylethylenimines are first prepared in monomeric form. These compounds are liquids or low-melting solids whose general formula is

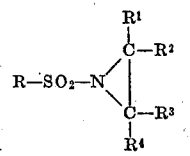

wherein R is a monovalent hydrocarbon, e. g., an alkyl, cyclo-, alkyl, aryl, or aralkyl radical, and $R^1$, $R^2$, $R^3$, and $R^4$ are hydrogens or hydrocarbon radicals. The monomers are prepared by reacting a sulphonic acid chloride with monomeric ethylenimines according to the equation:

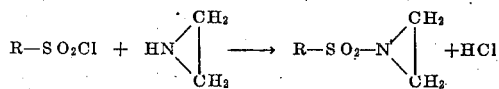

Since a product free from polymer is desired, it is essential to neutralize the hydrochloric acid formed, inasmuch as hydrochloric acid exerts a strong polymerizing action on ethylenimine which might otherwise react in the polymeric form. Therefore, it is desirable to operate in the presence of alkali to absorb the free acid. The monomeric sulphonylethylenimines are insoluble in alkali and may be isolated without difficulty.

The monomeric N-sulphonylethylenimines so obtained, some of which are already described in the scientific literature, may be polymerized under certain conditions set forth in greater detail below. The polymerization probably involves opening of the ethylenimine ring with formation of a linear polymer containing a plurality of sulphonylethylenimine units of the type

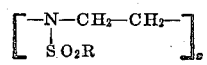

This is substantiated by the fact that the polymeric sulphonylethylenimines are insoluble in alkali. Interpolymers containing substantial proportions of ethylenimines, e. g., five moles per mole of sulphonylethylenimine are soluble in alkali. Polymerization may be induced by heating the monomers substantially above their melting point for a sufficient length of time, if desired, in the presence of a polymerization catalyst. It has been found that organic bases are effective catalysts; on the other hand, acids, e. g. arylsulphonic acids and acetic acid considerably retard the polymerization. The polymeric sulphonylethylenimines are high-melting solids insoluble in the common organic solvents and remarkably stable towards hydrolytic agents such as alkalies and acids.

The physical properties of the polymeric sulphonylethylenimines may be modified by carrying out the polymerization in the presence of an alkaline catalyst. Of particular interest is the interpolymerization of mixtures of sulphonylethylenimines with ethylenimines. The reaction then proceeds spontaneously and involves both components; the product is an interpolymer whose physical properties differ from those of both polymeric sulphonylethylenimine and polymeric ethylenimines and depend upon the relative proportions of the components. The polymers may then be obtained as resins with a variable degree of softness.

N-sulphonylethylenimines are particularly well adapted to polymerization in situ, i. e., the monomer may be deposited on materials such as cloth, paper, leather, etc., and subsequently subjected to polymerization. The mild conditions which are in general sufficient to bring about the polymerization are favorable factors since the impregnated material is thereby protected from deterioration.

The preparation of the monomeric N-sulphonylethylenimines is exemplified in Examples A, B, and C below, wherein parts are by weight.

EXAMPLE A

Monomeric N-p-toluenesulphonylethylenimine is prepared as follows:

To a solution of 110 parts of sodium hydroxide in 1600 parts of water is added with stirring 92 parts of monomeric ethylenimine, then 380 parts of powdered p-toluenesulphonyl chloride. The reaction mixture is kept at 32–35° C. by means of occasional cooling. The mixture is stirred for about 3 hours after addition of the p-toluenesulphonyl chloride, then filtered. The crude p-toluenesulphonylethylenimine, after thorough washing with water and drying, is a solid melting at 62–63°. The yield is 85–90 per cent of the theory. The product may be purified by dissolving it in 650 parts of warm benzene, filtering and adding 1750 parts of ligroin. p-Toluenesulphonylethylenimine crystallizes out as a white solid melting sharply at 64–65° C. This compound appears in two crystalline forms, one of which is unstable and melts at 51.5° C. This forms goes over spontaneously to the stable modification, M. P. 64.5° C.

EXAMPLE B

Monomeric N-n-octylsulphonylethylenimine is prepared by dissolving a slight excess of ethylenimine in 6 per cent sodium hydroxide solution and treating this solution with n-octyl-sulphonyl chloride. The reaction product is a colorless oil which is washed thoroughly with water and dried. The yield is nearly quantitative.

EXAMPLE C

Monomeric N-cyclohexylsulphonylethylenimine is prepared by dissolving a slight excess of ethylenimine in 6 per cent sodium hydroxide and treating this solution with cyclohexanemonosulphonyl chloride in portions with vigorous shaking. The reaction product is a colorless oil which may be separated by extracting with ether and removing the solvent ether under reduced pressure.

The practice of the invention is illustrated by the following examples, wherein parts given are by weight. There are, of course, many forms of the invention other than these specific embodiments.

EXAMPLE I

*Poly-N-p-toluenesulfonylethylenimine*

Monomeric p-toluenesulphonylethylenimine is heated at 100° C. After a few minutes the melt becomes viscous, then solidifies. After about 4 hours at 100° C., the product is a polymeric white solid melting around 250–255° C. Whereas the monomer is readily soluble in the common solvents, the polymer is insoluble in water, alcohol, benzene, carbon tetrachloride, glacial and 50% acetic acid, benzyl alcohol, formamide, methylcyclohexanol, acetonitrile, pyridine and camphor at the boiling point of these solvents. It is also insoluble in and unaffected by hot 15 per cent aqueous potassium hydroxide and hot concentrated hydrochloric acid. It is soluble in hot m-cresol and hot nitrobenzene.

EXAMPLE II

Monomeric p-toluenesulphonylethylenimine is heated at 100° C. for 1½ hours. The solid so obtained is then dissolved in m-cresol and the solution heated at 180–190° C. for 18 hours. The polymer is recovered by diluting the m-cresol solution with alcohol. The solid so obtained, after thorough washing with alcohol, melts at about 280° C. It has the same solubility characteristics as the product of Example I.

Addition of a small amount of p-toluenesulphonic acid to monomeric p-toluenesulphonylethylenimine effectively prevents its polymerization. After 4 hours at 100° C., the product is substantially unchanged. On the other hand, organic bases are polymerization catalysts, as shown in the following example:

EXAMPLE III

A solution of 4.95 parts of p-toluenesulphonylethylenimine in 16 parts of benzene is treated with 2.57 parts of diethylenetriamine, whereupon the temperature rises rapidly up to about 45° C. After one hour the solution is refluxed for 2 hours. After evaporation of the solvent, the product is a rather soft resin insoluble in water, soluble in 50 per cent acetic acid. Other organic bases such as aniline, ethylaniline or pyridine may be substituted for diethylenetriamine; the spontaneous reaction is then somewhat slower. The products are resinous in character and are soluble in glacial and 50 per cent acetic acid. The diethylenetriamine is probably both catalyst and reactant.

When monomeric ethylenimine is used as the basic catalyst, the polymerized product contains most of the ethylenimine applied; this and the fact that the properties of the polymer differ in solubility in acids, alkalies and organic solvents and in appearance, melting point, etc., from those of both polymeric sulphonylethylenimine and polymeric ethylenimine indicates that it is an interpolymer of sulphonylethylenimine with ethylenimine. This reaction is illustrated in the following examples:

EXAMPLE IV

To a solution of 39.4 parts of monomeric p-toluenesulphonylethylenimine in 60 parts of benzene is added 8.6 parts of monomeric ethylenimine. After a few minutes a spontaneous reaction begins with evolution of heat. The temperature is kept below 35° by external cooling. When the spontaneous reaction has subsided, the solution is refluxed 3½ hours. After removing the solvent, the residue is evaporated to constant weight at 100° C. at a pressure of 0.5 mm. It is then a light colored, homogeneous resin softening below 50°. Its weight (48 parts) and its solubility properties indicate that all of the ethylenimine applied is present and has interpolymerized with p-toluenesulphonylethylenimine. The polymer is insoluble in water, soluble in acetic acid and formic acid, but precipitates when water is added to these solutions. It is soluble in acetone and hot alcohol, slightly soluble in cold alcohol and not appreciably soluble in alkali. Evaporation of benzene-acetic acid solution gives a clear, colorless film which hardens on baking at 100° C.

EXAMPLE V

To a solution of 39.4 parts of p-toluenesulphonylethylenimine in 60 parts of benzene is added 25.8 parts of monomeric ethylenimine. The solution is treated as in Example IV. The weight of the residual polymer (54.2 parts) shows that about 57 per cent of the ethylenimine is present in the polymer. The polymer is a light-colored resin softening below 50°. It is insoluble in water but its solution in acetic acid does not precipitate on dilution with water. It is soluble in hot alcohol, less so in cold. It also gives clear films hardening at 100° C.

EXAMPLE VI

To a solution of 39.4 parts of monomeric p-toluene sulphonylethylenimine in 60 parts of benzene is added 43 parts of monomeric ethylenimine. The solution is treated as in Example IV. The weight of the residual polymer (63.2 parts) shows that about 55 per cent of the ethylenimine is present. The polymer is at light-colored resin softening below 50° soluble in 6% aqueous hydroxide. Its solution in acetic acid does not precipitate on dilution with water. It is an excellent dispersing agent for pigments.

Polymeric ethylenimine may be substituted for the monomeric material, as shown by the following example.

EXAMPLE VII

To 9.85 parts of monomeric p-toluenesulphonyl-ethylenimine is added 2.15 parts of polymeric ethylenimine without solvent. There is a spontaneous reaction with evolution of much heat. The product is a light-colored, homogeneous resin having the same solubility characteristics as that of Example IV.

EXAMPLE VIII

N-octylsulphonylethylenimine is heated at 125° C. for 6 hours. The resulting solid polymer melts at about 280° C. It is insoluble in ethanol, butanol, glycerol, triethylene glycol, carbon tetrachloride, benzene, acetic acid, dioxan, beta-methoxy-ethanol; very sparingly soluble in pyridine, benzyl alcohol, bromobenzene, cyclohexanol; soluble in m-cresol, nitrobenzene, o-hydroxydiphenyl, and dimethylaniline.

EXAMPLE IX

N-cyclohexylsulphonylethylenimine is heated at 100° C. for 1½ hours. The resulting solid melts at about 265° C. It is insoluble in water, alcohol, ether, toluene; it is insoluble in and unaffected by concentrated hydrochloric acid and 10 per cent aqueous sodium hydroxide.

The polymeric N-sulphonylethylenimines described in the preceding examples and particularly the interpolymers with amino-nitrogen containing substances, e. g. ethylenimine, have the property of being absorbed and firmly retained by cellulosic materials. Cellulose so impregnated shows remarkable affinity for acid dyes. The following examples illustrate this application.

EXAMPLE X

The interpolymer prepared according to Example VI is dissolved in 6 per cent sodium hydroxide and added to a viscose solution, the ratio of the cellulose to the polymer being 10 to 1 by weight. After standing overnight at room temperature, the viscose solution is spun according to the usual procedure. The yarn so obtained has good strength and appearance. It contains 0.9 per cent of nitrogen and is readily dyed by wool dyes. The colors are fast to laundering.

EXAMPLE XI

A solution of 4 parts of monomeric p-toluene-sulphonylethylenimine and 1 part of pyridine in 160 parts of benzene is prepared. A sample of muslin is soaked in the boiling solution for 5 minutes, wrung out, and baked at 100° C. for 30 minutes. This treatment gives 2.9 per cent impregnation. The treated fabric, which is substantially unchanged in appearance or feel, shows improved water-repellency and remarkable affinity for wool dyes. The colors are fast to laundering, e. g. they are fast to 30 minute treatment at 50° C. in 0.25% soap solution plus 0.1% soda ash.

In the precess of the present invention any monomeric N-sulphonylethylenimine may be used. There may be prepared as indicated in Examples A, B, and C above from an ethylenimine and the organic monosulphonyl chloride $RSO_2Cl$ in which R is a hydrocarbon, e. g., an alkyl, cycloalkyl, aralkyl or aryl radical, e. g. ethyl, propyl, isopropyl, butyl, isobutyl, amyl, isoamyl, tertiary amyl, hexyl, decyl, dodecyl, hexadecyl, methylcyclohexyl, phenyl, naphthyl, benzyl, phenylethyl, diphenylmethyl, etc. Mixtures of sulphonyl halides may be used, e. g. paraffin wax sulphonyl chlorides prepared by the reaction of $SO_2$ and chlorine on paraffin wax. Any monomeric ethylenimine may be used including the preferred ethylenimine, per se,

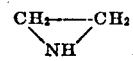

but also C-substituted ethylenimines, such as 1-methylethylenimine, 1,1-dimethylethylenimine, 1,2-dimethylethylenimine, 1-ethylethylenimine, 1-methyl-2-ethylethylenimine, 1-hexylethylenimine, 1-dodecylethylenimine, 1-phenylethylenimine, 1,2-diphenylethylenimine, etc. The term "an ethylenimine" comprehends not only ethylenimine per se but also these C-substituted ethylenimines.

The polymerization process of the present invention may be carried out under a variety of conditions. An elevated temperature is often desirable, but by no means necessary; for example N-n-octylsulphonylethylenimine may be polymerized at room temperature. Temperatures substantially above 150° C. are not in general desirable; if higher operating temperatures are desired, it is preferable to work in an inert solvent capable of keeping the polymer in solution, e. g., meta-cresol and nitrobenzene, among others. The polymerization may be carried out at atmospheric, superatmospheric, or subatmospheric pressures. Fillers, plasticizers, pigments, dyes, etc., may be mixed with the polymerizable material either before polymerization or at any subsequent stage. The degree of polymerization, i. e., molecular weight, may be controlled to some extent by the duration and temperature of the process. The polymerization may also be conducted in emulsion or suspension in a suitable medium. In the treatment of viscose, polymeric sulphonylethylenimines may be added at any stage of the process, or a mixture of monomeric sulphonylethylenimine and ethylenimine may be added and allowed to polymerize.

Catalysts may be used if desired. Basic catalysts are effective. Inorganic bases such as ammonia, sodium hydroxide, potassium hydroxide, sodium carbonate, calcium hydroxide, or magnesium hydroxide may be used, but organic bases such as aniline, dimethylaniline, pyridine, tributylamine, piperidine, hexamethylenimine, etc., are particularly efficient and are of special value when the polymerization is to be carried out in solution, since without a catalyst, polymerization in a solvent in general is slower.

Monomeric ethylenimines are particularly valuable catalysts and also function when present in adequate amount as polymerization reaction components. In the presence of monomeric ethylenimines, the polymerization proceeds spontaneously, as has been mentioned above. Interpolymers with a wide range of physical properties may be obtained, depending upon the relative proportions of the components. A small amount of ethylenimine yields a hard, tough resin insoluble in dilute or even concentrated acetic acid and the common solvents; higher proportions of ethylenimine to N-sulphonylethylenimine yield resins of increasing solubilities in dilute acids and common solvents. For this purpose, it is possible to use, besides ethylenimine itself, any polymerizable ethylenimine such as, for example, the C-substituted ethylenimines listed above and, in addition, N-substituted ethylenimines such as N-methylethylenimine, N-ethylethylenimine, N-octylethylenimine, N-dodecylethylenimine, N-octadecylethylenimine, N-benzylethylenimine, etc. In the presence of catalysts, the polymerization may be carried out at low or moderate temperatures; catalysts are therefore valuable when it is desired to polymerize the sulphonylethylenimine in situ.

The polymeric sulphonylethylenimines, either per se or interpolymerized with ethylenimines, are valuable ingredients in molding, coating and film-forming compositions. They may be used as pigment-dispersing agents and emulsion stabilizers. The monomeric materials may be polymerized in situ and used as coating and impregnating agents for cotton, rayon, acetate silk, cellulosic materials, papers, leather, rubber, etc. Valuable properties such as water repellency and affinity for acid dyestuffs may thereby be imparted to fabrics. Viscose, cellulose acetate and cellulosic fibers in general treated with polymeric N-sulphonylethylenimines or interpolymers of N-sulphonylethylenimines with ethylenimines yield a yarn which contains firmly bound nitrogen and is readily susceptible to acid dyes.

This invention makes available a new class of polymeric materials. The monomeric sulphonylethylenimines are readily available and may be polymerized under very mild and varied conditions, thus are easily adaptable to large scale manufacturing. The polymers are high-melting, chemically resistant, difficulty-soluble materials but can also, if desired, be obtained as low-melting, more soluble interpolymers, thereby lending themselves to a variety of applications. The ready polymerization of the monomeric materials makes them particularly well adapted to polymerization in situ without injury to the supporting materials. Moreover, it is possible to interpolymerize the monomeric sulphonylethylenimines with ethylenimines in all proportions to obtain polymers with a wide range of properties, e. g., a wide range of solubilities in dilute acids and common solvents.

The above description and examples are intended to be illustrative only. Any modification of or variation therefrom which conforms to the spirit of the invention is intended to be included within the scope of the claims.

I claim:

1. A polymerization product of monomeric N-p-toluenesulphonylethylenimine.

2. A polymerization product of a monomeric N-arylsulphonylethylenimine.

3. A polymerization product of a monomeric N-sulphonylethylenimine wherein a monovalent hydrocarbon radical is attached thru the sulphonyl radical to the ethylenimine nitrogen.

4. A polymerization product of a monomeric N-sulphonyl derivative of an ethylenimine wherein a monovalent hydrocarbon radical is attached thru the sulphonyl radical to the ethylenimine nitrogen.

5. An interpolymer of a monomeric N-sulphonyl derivative of an ethylenimine wherein a monovalent hydrocarbon radical is attached thru the sulphonyl radical to the ethylenimine nitrogen with a polymerizable ethylenimine containing only carbon, hydrogen and nitrogen.

6. An interpolymer of a monomeric N-sulphonyl derivative of ethylenimine wherein a monovalent hydrocarbon radical is attached thru the sulphonyl radical to the ethylenimine nitrogen with a monomeric ethylenimine containing only carbon, hydrogen and nitrogen.

7. An interpolymer of monomeric N-p-toluenesulphonylethylenimine with monomeric ethylenimine.

GERARD J. BERCHET.

CERTIFICATE OF CORRECTION.

Patent No. 2,269,997.  January 13, 1942.

GERARD J. BERCHET.

It is hereby certified that error appears in the printed specification of the above numbered patent requiring correction as follows: Page 3, first column, line 29, after "aqueous" insert --sodium--; and second column, line 22, for "precess" read --process--; and that the said Letters Patent should be read with this correction therein that the same may conform to the record of the case in the Patent Office.

Signed and sealed this 3rd day of March, A. D. 1942.

(Seal)

Henry Van Arsdale,
Acting Commissioner of Patents.